(12) United States Patent
Bastasch et al.

(10) Patent No.: US 7,921,981 B2
(45) Date of Patent: Apr. 12, 2011

(54) METHOD AND APPARATUS FOR CONVEYING AND ARRANGING BAKERY PRODUCTS

(75) Inventors: Paul M. Bastasch, Overland Park, KS (US); John T. McCormick, Shawnee, KS (US)

(73) Assignee: United Bakery Equipment Company, Inc., Lenexa, KS (US)

( * ) Notice: Subject to any disclaimer, the term of this patent is extended or adjusted under 35 U.S.C. 154(b) by 273 days.

(21) Appl. No.: 12/243,582

(22) Filed: Oct. 1, 2008

(65) Prior Publication Data

US 2010/0078294 A1    Apr. 1, 2010

(51) Int. Cl.
B65G 47/44    (2006.01)

(52) U.S. Cl. ......... 198/390; 198/398; 198/399; 198/411

(58) Field of Classification Search ............... 198/390, 198/398, 399, 411
See application file for complete search history.

(56) References Cited

U.S. PATENT DOCUMENTS

| | | | | |
|---|---|---|---|---|
| 3,623,592 A | * | 11/1971 | Anderson | 198/446 |
| 3,993,187 A | * | 11/1976 | Knez | 198/382 |
| 4,047,636 A | * | 9/1977 | List | 221/161 |
| 4,163,487 A | * | 8/1979 | Dupuis | 198/383 |
| 4,261,680 A | * | 4/1981 | Carnley et al. | 414/421 |
| 4,308,943 A | * | 1/1982 | Gierhart | 198/399 |
| 4,483,435 A | * | 11/1984 | Ionescu | 198/399 |
| 4,495,132 A | * | 1/1985 | Johnson | 264/293 |
| 4,503,966 A | * | 3/1985 | Papalexis et al. | 198/382 |
| 4,574,939 A | * | 3/1986 | Dubuit | 198/396 |
| 4,653,628 A | * | 3/1987 | Claypool et al. | 198/395 |
| 4,789,290 A | * | 12/1988 | Barnhart et al. | 414/798.4 |
| 4,854,455 A | * | 8/1989 | Faivre | 209/678 |
| 4,907,686 A | * | 3/1990 | Cotic | 193/45 |
| 4,941,562 A | * | 7/1990 | Proepper et al. | 198/416 |
| 4,995,157 A | * | 2/1991 | Hall | 29/740 |
| 5,660,262 A | * | 8/1997 | Landrum et al. | 198/411 |
| 6,044,959 A | * | 4/2000 | Monsees | 198/461.1 |
| 6,082,523 A | * | 7/2000 | Weeks | 198/375 |
| 6,909,936 B2 | * | 6/2005 | Franzaroli | 700/159 |

* cited by examiner

Primary Examiner — Joe Dillon, Jr.
(74) Attorney, Agent, or Firm — Husch Blackwell LLP

(57) ABSTRACT

A method and apparatus for conveying and arranging bakery products such as hot dog buns or breadsticks. The products are delivered with their length dimensions at a variety of angular orientations and some products inverted. An aligning conveyor receives misaligned products on adjacent belts or other drive members which are driven at differential speeds to rotate the products to the proper orientation. Inverted products are conveyed against guide rails which are arranged to interact with the curved edges on the tops of the buns to roll the inverted products over. The products are conveyed in discrete lanes to properly organize them for packaging.

4 Claims, 5 Drawing Sheets

METHOD AND APPARATUS FOR CONVEYING AND ARRANGING BAKERY PRODUCTS

CROSS-REFERENCE TO RELATED APPLICATIONS

None.

FIELD OF THE INVENTION

This invention relates generally to the handling of bakery products such as hot dog buns and deals more particularly with a method and apparatus for conveying bakery products in a manner to align them in columns and to roll over inverted products for subsequent handling and packaging.

In bakeries that produce hot dog buns, bread sticks and other products that must be subsequently packaged, it is often necessary to properly organize and arrange the products so that they can be efficiently packaged. The products come out of the baking facility in random orientations with their length dimensions at a variety of angles and some of the products inverted. In the past, manual labor has typically been required to physically turn the misaligned products so that they are all parallel and pointing in the same direction. The inversion of upside-down products has also typically been carried out manually.

As can easily be appreciated, the need for substantial manual operations increases the costs and the time required to process baked products so that they are properly arranged to be packaged. Accordingly, economic benefits and efficiencies can be achieved by the provision of an automated conveying system that operates to properly align the misaligned products and to invert upside down products while organizing the products in discrete lanes so that they can be packaged properly and efficiently.

SUMMARY OF THE INVENTION

The present invention is directed to the conveying and arranging of bakery products such as hot dog buns, breadsticks and other products that have a length dimension and a shorter width dimension.

One aspect of the invention involves a method and apparatus for aligning misaligned products and placing the products in discrete lanes in which the products are arranged one behind the other in columns. In accordance with this aspect of the invention, the products may be delivered to an aligning conveyor having guides which provide lanes that receive the products oriented with their length dimensions generally parallel to the lanes. Misaligned products are deposited on the upper edges of the guides, and belts or chains traveling at differential speeds on adjacent guides turn the misaligned products until they are oriented to drop into the lanes for conveyance downstream.

In accordance with another aspect of the invention, inverted products may be rolled over while avoiding rolling over products that are not inverted. This may be carried out by conveying the products between guide rails that form continuations of the lanes so that the products are maintained one behind the other. The guide rails may be contoured such that they are curved or angled into the path followed by the products as they are conveyed along the lanes. Inverted products may be directed against the curved or angled sections of the guide rails with the curved upper edges of the products contacting and interacting with the rails in a manner to cause the inverted products to roll over. Non-inverted products engage the guide rails but are not turned over because their curved upper edges are already oriented properly and they do not interact with the guide rails.

In this manner, bakery products that are misaligned may be properly aligned in their lanes, and/or inverted products may be rolled over and maintained in their lanes. As a result, the bakery products are arranged properly to be packaged while eliminating the manual labor that characterizes the conventional practice that has been typical in the industry.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DESCRIPTION OF THE PREFERRED EMBODIMENT

Figure 1:
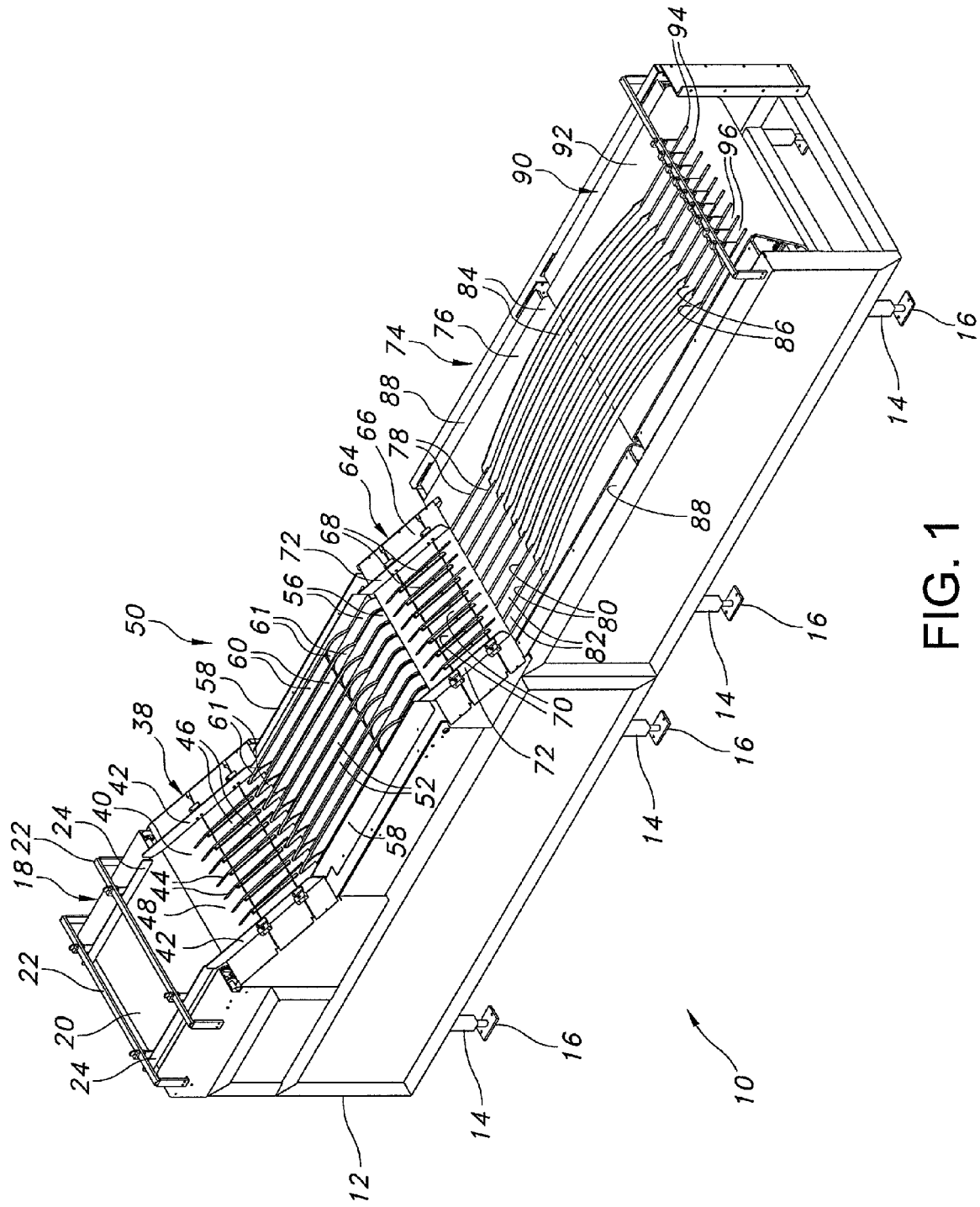
FIG. 1 is a perspective view of a machine constructed to convey and organize hot dog buns and other bakery products in accordance with a preferred embodiment of the present invention.
Figure 2:
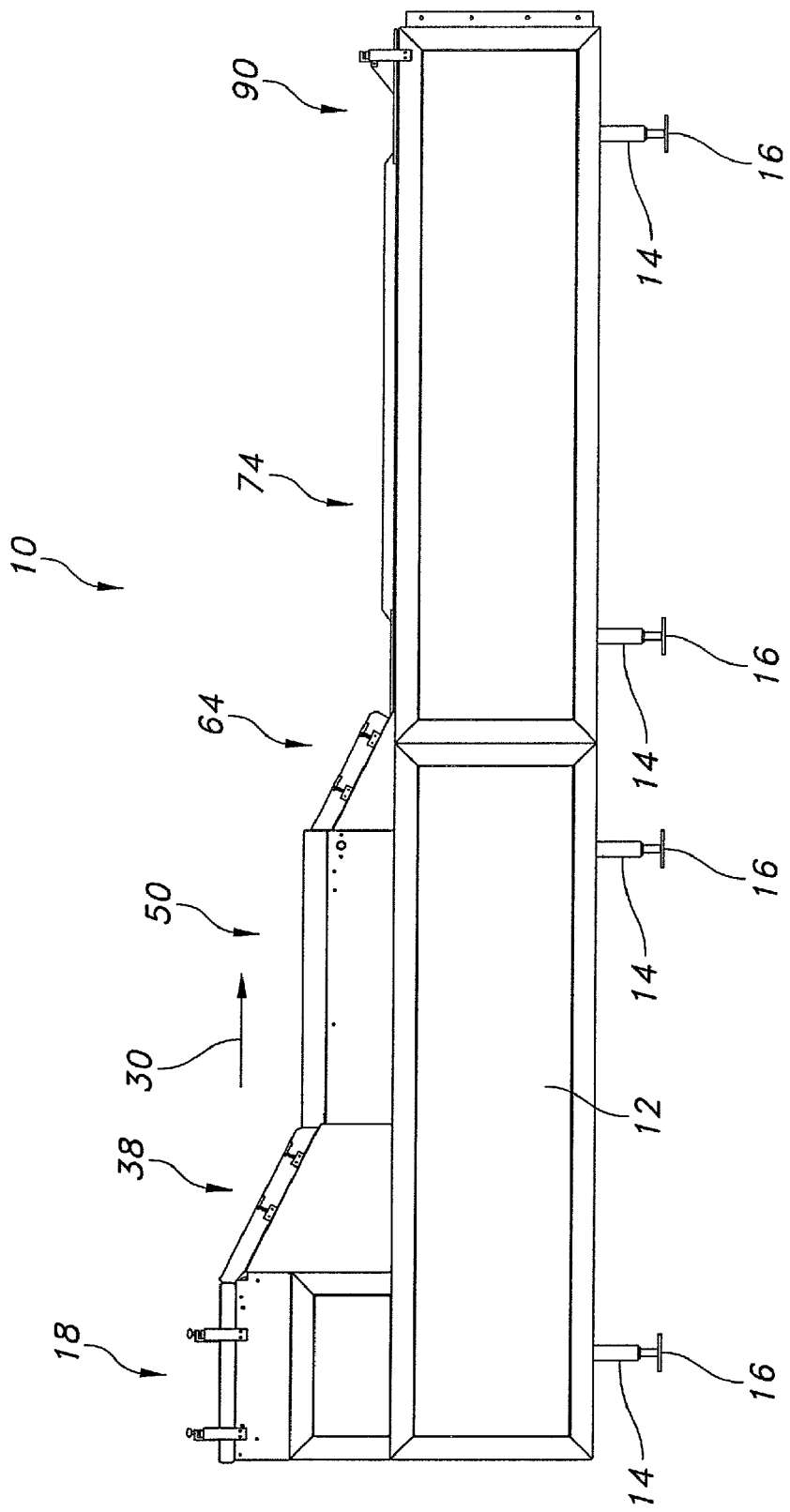
FIG. 2 is a side elevation view of the machine shown in FIG. 1.
Figure 3:
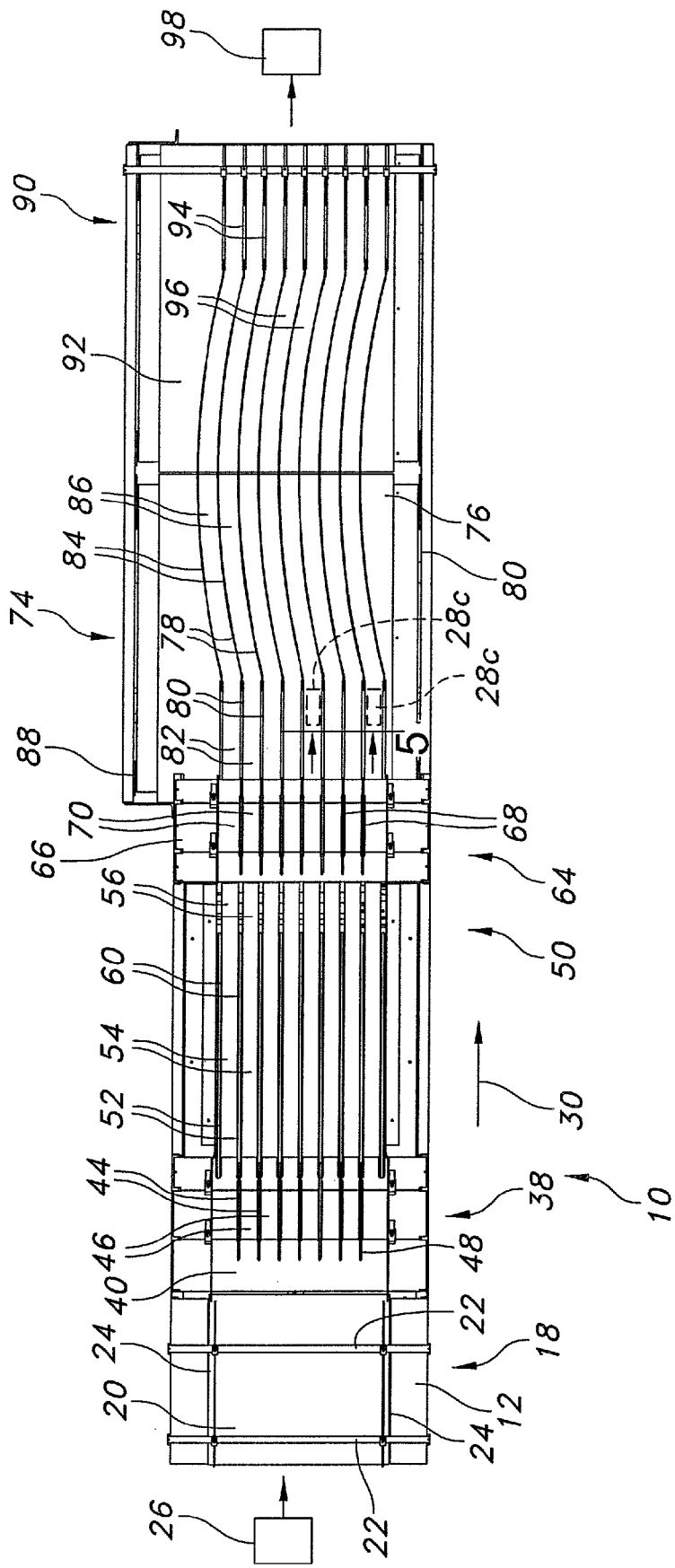
FIG. 3 is a top plan view of the machine shown in FIGS. 1 and 2.

Referring now to the drawings in more detail and initially to FIGS. 1 and 3 in particular, numeral 10 generally designates a machine which is constructed in accordance with a preferred embodiment of the present invention and which is used to convey and arrange hot dog buns, breadsticks and other bakery products.

The machine 10 has a rigid frame 12 which may be constructed of a suitable material such as sheet metal and may have a generally rectangular shape and a multi-tier configuration. The frame 12 is supported on a plurality of legs 14 which may be equipped with adjustable feet 16 allowing the machine 10 to be supported on a suitable horizontal support surface.

At the input or upstream end of the machine, an infeed metering conveyor generally identified by numeral 18 is mounted on the frame at an elevated location. The metering conveyor 18 includes a driven horizontal conveying belt 20 which may be mounted on rollers (not shown) in a conventional manner. The upper surface of the belt 20 provides a horizontal surface on which the bakery products are conveyed as the belt 20 is driven forwardly. Elevated bars 22 extend laterally across the metering conveyor 18 at positions located to maintain the bakery products down on the conveyor belt 20. Lateral side barriers 24 are provided on the opposite sides of the metering conveyor 18 to maintain the products on belt 20.

Figure 4:
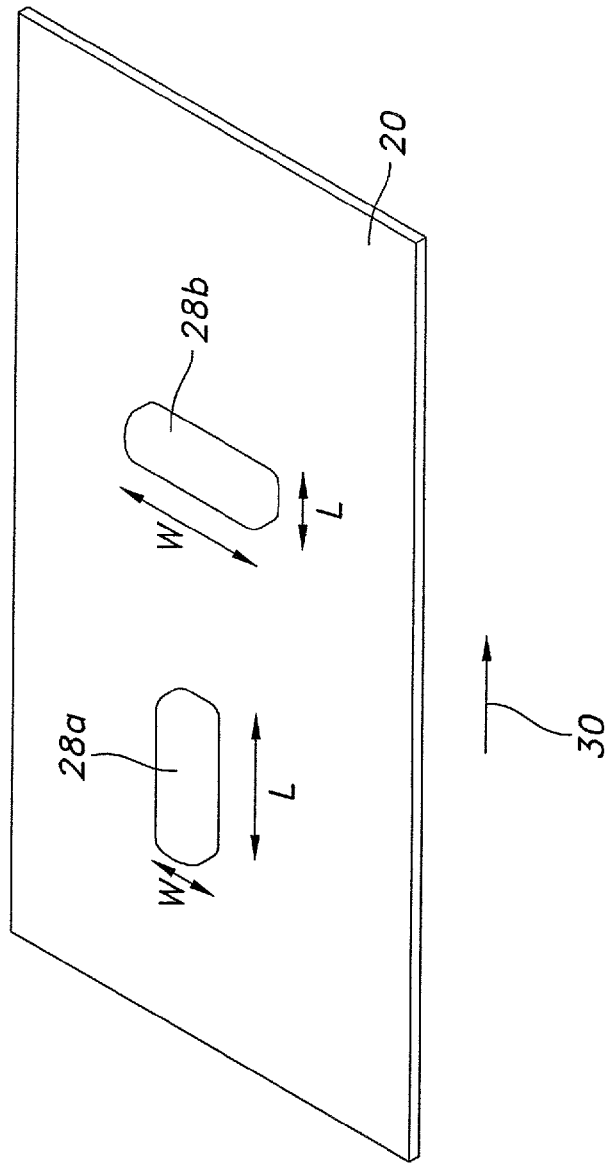
FIG. 4 is a fragmentary perspective view on an enlarged scale illustrating a pair of hot dog buns with one bun oriented lengthwise and the other bun oriented crosswise at the infeed end of the machine.

The metering conveyor 18 receives the bakery products from upstream equipment 26 (see FIG. 3) and is adjusted in its speed to transfer the bakery product downstream at an appropriate rate. As best shown in FIG. 4, the bakery products, such as the hot dog buns 28a and 28b are delivered to the metering conveyor 18 at a variety of angular orientations. Each of the hot dog buns 28a and 28b has a longitudinal or length dimension L and a shorter width dimension W. The buns delivered onto the metering conveyor belt 20 may be oriented with their length dimensions in a variety of angular orientations relative to the conveying direction which is indicated by the directional arrow identified by numeral 30 in FIG. 4. The conveying direction 30 is the direction in which the buns are conveyed along the length of the conveyor 10. The bun 28a is oriented with its length dimension L substantially parallel to or coincident with the conveying direction 30, whereas bun 28b is oriented with its length dimension L perpendicular or crosswise to the conveying direction 30. Other buns may be arranged with their length dimensions oriented at any angle between the two extreme positions exemplified by the buns 28a and 28b.

Figure 5:
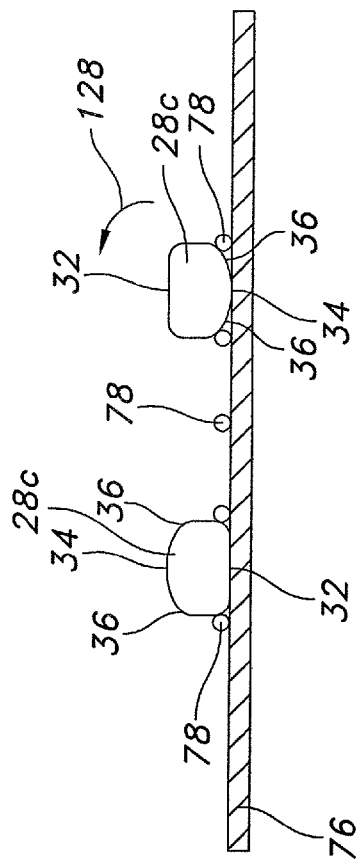
FIG. 5 is a fragmentary sectional view on an enlarged scale taken generally along line 5-5 of FIG. 3 in the direction of the arrows and showing an inverted bun and a non-inverted bun at the rollover section of the machine.

The buns are also delivered onto belt 20 in a manner such that some of the buns are inverted. As best shown in FIG. 5 for buns 28c and 28d, each bun has a bottom surface 32 which may be a substantially flat surface. Each bun also has a top surface 34 which is characterized by curved side edges 36 where the top surface 34 intersects with the opposite sides of the bun. The buns may be delivered onto the metering conveyor belt 20 in an inverted position with the top surface 34 down, as is the case with bun 28d in FIG. 5. Some of the buns are delivered onto the metering conveyor belt 20 in a non-inverted position in which the bottom surface 32 is down, as is the case with bun 28c in FIG. 5.

The downstream end of the metering conveyor belt 20 deposits the buns onto a first or upstream slide section 38 having a flat slide surface 40 that is mounted on the frame to incline downwardly in a downstream direction or away from the metering conveyor 18. The opposite sides of the slide surface 40 are equipped with side barriers 42 which maintain the bakery products on surface 40. A plurality of spaced apart guide elements 44 project upwardly from the slide surface 40. The guide elements 44 may be adjustable from side to side so that the distance between adjacent guide elements is adjustable to conform generally with the width dimension W of the bakery products that are being handled. The spaces between adjacent guide elements 44 define a plurality of lanes 46 which extend coincident with or parallel to the conveying direction 30 and are preferably slightly wider than the buns or other products handled by the machine 10. The guide elements 44 have tapered upstream ends 48 that provide for gradual entry of the bakery products into lanes 46 for those products oriented with their length dimensions L substantially parallel to the conveying direction 30.

The lower end of the slide section 38 connects with and delivers the bakery products to an aligning conveyor which is generally identified by numeral 50. The aligning conveyor 50 is provided with a plurality of spaced apart guides 52 that are parallel to one another and substantially aligned with the guide elements 44 on slide 38. The spaces between the guides 52 form side-by-side parallel lanes 54 that essentially form continuations of the lanes 46. A plurality of driven belts 56 are driven in paths underlying the respective lanes 54 and move in a downstream direction with their upper surfaces in a horizontal plane to convey the bakery products that are captured in the lanes 54. The belts 56 may be drawn around rollers (not shown) or mounted in another conventional manner. Side barriers 58 are provided on the opposite sides of the aligning conveyor 50.

Each of the guides 52 has a horizontal upper edge that is equipped with a drive belt 60. The drive belts 60 may be drawn around upstream and downstream sheaves or pulleys 61 which may be driven in a direction to drive the belts 60 along the upper edges of guides 52 in a downstream direction. Every other one of the drive belts 60 is driven at a different speed. Thus, adjacent belts are driven either slower or faster than the adjacent belt or belts so that there is a speed differential between each adjacent pair of belts 60. As an alternative to belts 60, chains or other drive members may be used.

The guides 52, belts 60 and pulleys 61 may be mounted on a carriage 62 (see FIG. 6) located below the horizontal surface formed by the upper runs of the belts 56. The carriage 62 may be mounted on the frame for up and down linear movement. The carriage 62 may be raised to the extended position shown in FIG. 1 in which the guides 52 extend well above the belts 56. The carriage 62 may also be retracted downwardly such that the upper edges of the guides 52 and the belts 60 are below the plane of the belts 56. Any suitable manner of mounting the carriage 62 is acceptable.

A second or downstream slide section generally identified by numeral 64 is located on the frame adjacent to the downstream end of the aligning conveyor 50. The slide section 64 includes an inclined slide surface 66 which inclines downwardly in a downstream direction away from the aligning conveyor 50. A plurality of parallel guide members 68 are provided on surface 66 and may be adjusted side to side such that guide members 68 are substantially aligned with guides 52. Each of the guide members 68 may have a tapered upstream end for gradual entry of the bakery products into lanes 70 which are presented between the guide members 68 and essentially form continuations of lanes 54. Side barriers 72 are provided on opposite sides of the slide surface 66 to prevent the bakery products from moving laterally off of the slide section 64.

A rollover conveyor generally identified by numeral 74 is mounted on the frame adjacent to the downstream end of the slide section 64. The rollover conveyor 74 includes a driven conveyor belt 76 which is preferably constructed of rubber or another relatively high friction material. The belt 76 is drawn around rollers (not shown) or supported in another suitable manner such that its upper surface moves in a downstream direction in a horizontal plane to provide a conveying surface along which the bakery products are conveyed in the conveying direction 30.

The rollover conveyor 74 is equipped with a plurality of spaced apart guide bars or rails 78 which form dividers mounted a short distance above the conveyor belt 76. The guide rails 78 may be constructed of wire and have straight upstream end portions 80 that are substantially aligned with the guide members 68 to provide straight lanes 82 that extend parallel to the conveying direction 30 and essentially form continuations of lanes 70. As best shown in FIG. 3, each of the guide rails 78 is contoured and has a curved arcuate portion 84 which gradually curves inwardly into the adjacent lane 82 such that the curved portions 84 are located in the paths of incoming bakery product and intercept and are engaged by the bakery products. The curved portions 84 are curved equally to form curved lanes 86 that provide continuations of the lanes 82. Side barriers 88 are provided on the opposite sides of the rollover conveyor 74. As an alternative to the curved portions 84, the guide rails 78 may be provided with angled sections that angle into the paths formed by lanes 82, or with sections having some other shape.

The final section of the machine 10 is a return conveyor generally identified by numeral 90 located adjacent to the downstream end of the rollover conveyor 74. The return conveyor 90 includes a driven conveyor belt 92 which may be drawn over rollers (not shown) and located and arranged to form a downstream continuation of belt 76. It is preferred that belt 92 be constructed of a relatively low friction material having a lesser coefficient of friction than the conveyor belt 76 of the rollover conveyor. The curved portions 84 of guide rails 78 continue their extension above the return conveyor belt 92 and have straight downstream end portions 94 that are parallel to one another and may be aligned with the upstream end portions 80. Lanes 96 are presented between the downstream end portions 94 of the guide rail and may be in alignment with lanes 82. The return conveyor 90 discharges the bakery products to downstream equipment which is generally identified by numeral 98 (see FIG. 3) and may include packaging equipment.

Figure 6:
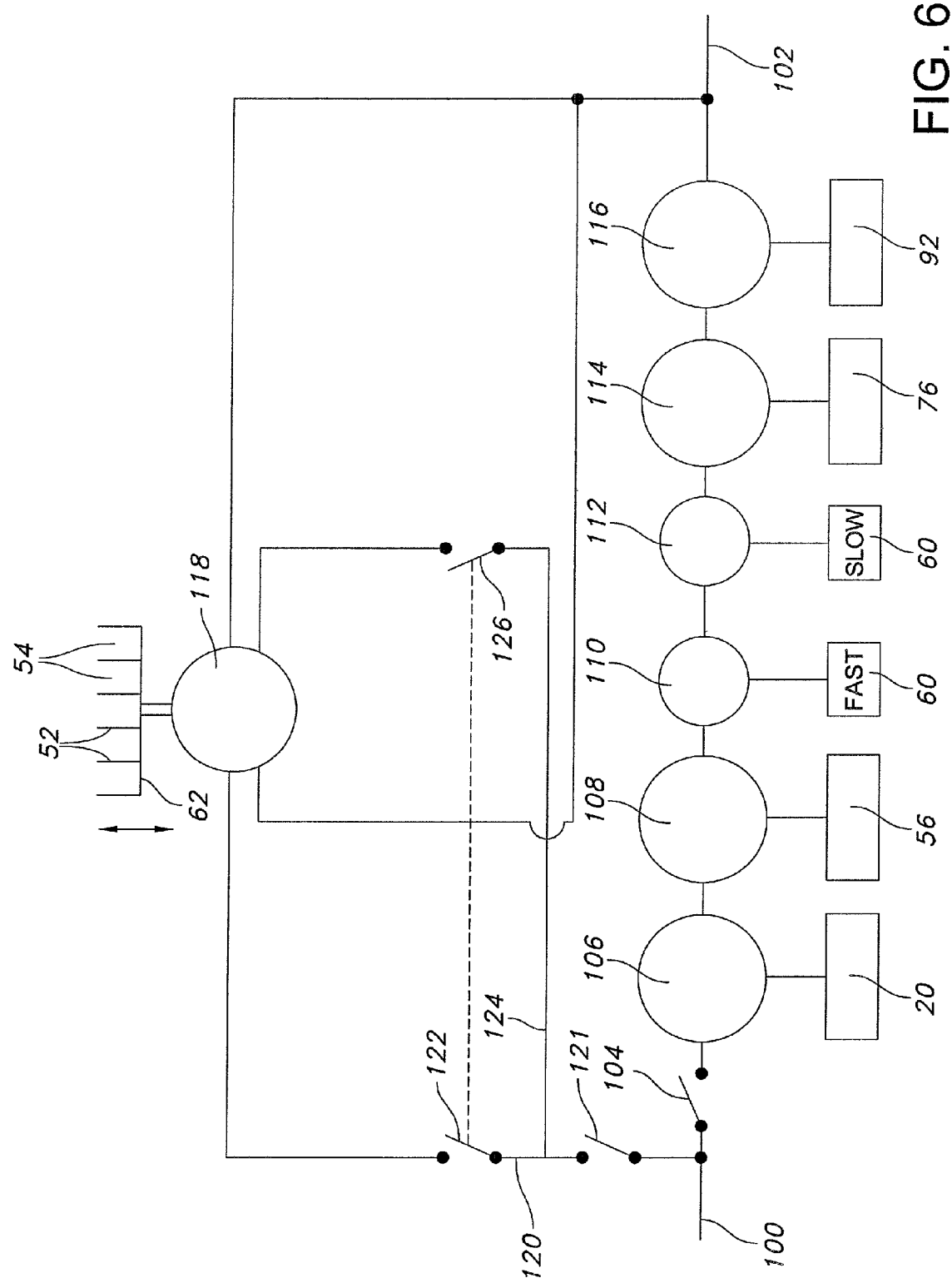
FIG. 6 is a schematic circuit diagram of electrical controls that may be provided for the machine.

FIG. 6 depicts a control system which is exemplary of the type of control system that may be used for control of the operation of machine 10. A power line 100 may connect with a neutral line 102 through a switch 104 and a plurality of motors that are energized when switch 104 is closed. The motors which are shown as being arranged in series but may be arranged in parallel as well include a motor 106 which drives the metering conveyor belt 20. Another motor 108 drives the aligning conveyor belts 56 when energized. Motor 110 is connected to drive alternating ones of the belts 60 at a relatively fast-speed, whereas another motor 112 is connected to drive the remaining belts 60 at a relatively low speed. Another motor 114 drives the rollover conveyor belt 76. The return conveyor belt 92 is driven by another electric motor 116. The motors 106-116 drive the belts through conventional drive systems (not shown) which may be of any suitable type.

Arranged in parallel with the motors 106-116 is another motor 118 which selectively moves the carriage 62 up and down between its extended and retracted positions. A line 120 connects with the power line 100 through an open-close switch 121. Line 120 is equipped with a switch 122 which, when closed, supplies power to motor 118 in a manner to operate motor 118 in a direction to raise the carriage 62 to its extended position. Another line 124 connects through switch 121 with the power line 100. Line 124 is provided with a down switch 126 which, when closed, supplies motor 118 with power in a manner to operate motor 118 in a direction to lower carriage 62 to its retracted position. Switches 122 and 126 may be ganged together such that one of the switches 122 and 126 is closed and the other open at all times.

In operation, hot dog buns or other bakery products are randomly delivered from the upstream equipment onto the metering conveyor belt 20 in a variety of angular orientations and with some of the products inverted and others non-inverted. Belt 20 is adjusted to an appropriate speed to optimize the transfer of the product from the upstream equipment to the first slide section 38.

The bakery products are discharged from belt 20 onto the slide section 38. Products that are oriented with their length dimensions parallel to or substantially parallel to the conveying direction 30 are captured in the lanes 46 between the guide elements 44. Products that are only slightly out of alignment may be captured in the lanes 46, while those that are misaligned substantially slide downwardly on the slide section 38 on top of the upper edges of adjacent pairs of guide elements 44.

The bakery products then reach the aligning conveyor 50, and those that are in lanes 46 move directly into lanes 54 and onto the conveying belts 56 where they are conveyed downstream in the lanes 54. Misaligned products are deposited on the belts 60 (or other driven members) on the upper edges of the guides 52. The misaligned products span two of the belts 60, and because of the differential speed between each pair of adjacent belts 60, each misaligned product is rotated by belts 60 until its length dimension is substantially parallel to the conveying direction 30, at which time the rotated product drops into the underlying lane 54 and is transported downstream on belts 56. In this manner, all or substantially all of the bakery products are oriented at the downstream end of the aligning conveyor 50 with the length dimension L of each product oriented parallel to the conveying direction 30.

The products discharged from the aligning conveyor 50 enter the lanes 70 of the downstream slide section 64 and slide downwardly along lanes 70 into lanes 82 and onto the belt 76 of the rollover conveyor 74. Any product that is not aligned at the downstream end of the aligning conveyor 50 will have been rotated closely enough to the proper orientation that it is captured in one of the lanes 70 and thereby oriented properly.

As the products are conveyed along belt 74 in lanes 82, inverted products such as the hot dog bun 28d shown in FIG. 5 are rolled over. Inverted products are conveyed against the curved rail portions 84 (or angled portions) with the curved rail portions 84 engaging and interacting with the curved edge 36 of bun 28d. As the bun 28d continues to be conveyed by the high friction belt 76, the bun tends to keep moving in a straight path, and the interaction of the curved rail portion 84 with the curved edge 36 progressively rolls the bun 28d by camming action as indicated by the directional arrow 128 in FIG. 5. This rolling action progresses until the bun 28d is eventually rolled completely over to a non-inverted position (the position of bun 28c in FIG. 5). This occurs prior to the bun 28d reaching the end of belt 76, so the upside down buns are inverted prior to reaching the end of the rollover conveyor 74. The buns are all guided along the curved lanes 86 by the curved portions 84 of the guide rails.

Buns that are non-inverted as they reach the rollover conveyor 74 (bun 28C in FIG. 5, for example) are not affected by the rollover conveyor because the curved guide rail portions 84 do not interact with non-inverted buns in the manner indicated previously with respect to inverted buns.

The buns are discharged from belt 76 onto belt 92 and are then conveyed along the return conveyor 90 with the low friction of belt 92 minimizing the chance of unintended rollover of any of the buns in the return conveyor section. At the end of the belt 92, the products are discharged to the downstream equipment 98.

In this manner, all of the bakery products are conveyed from the upstream equipment 26 to the downstream equipment 98 and are arranged one behind the other in columns formed by the lanes of the machine with the longitudinal axes of all of the products parallel to the conveying direction 30 and with all of the products in non-inverted positions. The products are thus delivered to the downstream equipment in the proper arrangement to be efficiently packaged. The method and apparatus of this invention (1) straightens the bakery products so that they are all pointing in one direction with their length dimensions parallel, and/or (2) rolls over any inverted products so that all of the products are resting on their stable, substantially flat bottom surfaces 32, and/or (3) organizes the products into discrete lanes each having all of the products in a straight column one behind the other.

When the machine 10 is used to handle symmetrical products such as hamburger buns or other products that do not require a particular orientation, carriage 62 may be lowered to its retracted position wherein guides 52 are retracted below the conveyor surface provided by belts 56 of the aligning conveyor 50.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. Apparatus for conveying and arranging bakery products each having a width dimension, a length dimension greater than the width dimension, a bottom surface, and a top surface with curved edges, said apparatus comprising:

a frame;

an infeed conveyor on said frame for receiving and conveying the bakery products with said length dimensions in a variety of angular orientations relative to a conveying direction in which the bakery products are conveyed and with some of the bakery products inverted such that the top surfaces thereof are down;

an upstream slide on said frame located to receive the bakery products from said infeed conveyor and having a plurality of spaced apart guide elements arranged to provide lanes between adjacent guide elements for receiving bakery products oriented with the length dimensions thereof generally parallel to said conveying direction, said upstream slide having a slide surface inclined downwardly away from said infeed conveyor for gravity feeding of the bakery products;

an aligning conveyor on said frame having a plurality of spaced apart guides substantially aligned with said guide elements and located to receive between said guides the bakery products that are in said lanes, said guides each having an upper edge surface;

a drive element on each of said upper edge surfaces, said drive elements on the upper edge surfaces of adjacent guides being driven at different speeds to turn misaligned bakery products delivered to said aligning conveyor with the length dimensions thereof offset substantially from said conveying direction, thereby turning such misaligned bakery products to allow dropping thereof between said guides;

a conveyor mechanism on said aligning conveyor operable to convey bakery products between said guides in said conveying direction;

a downstream slide on said frame located to receive the bakery products from said alignment conveyor and having a plurality of guide members substantially aligned with said guides to receive the bakery products between said guide members, said downstream slide having a slide surface inclined downwardly away from said aligning conveyor for gravity feeding of the bakery products;

a rollover conveyor on said frame having a plurality of guide rails located with upstream end portions thereof substantially aligned with said guide members to receive the bakery products between said guide rails; and means for conveying the bakery products in said conveying direction between said upstream end portions of the guide rails, said guide rails having rollover portions located and arranged to interact with said curved edges of the inverted bakery products in a manner to roll said inverted bakery products over onto said bottom surfaces.

2. Apparatus as set forth in claim 1, wherein said rollover portions of said guide rails comprised curved guide rail portions located in the paths of bakery products conveyed between adjacent guide rails to interact with said curved edges of the inverted bakery products.

3. Apparatus as set forth in claim 2, wherein said means for conveying the bakery products comprises an upstream conveyor surface on which the bakery products are conveyed between said upstream end portions of the guide rails and against said curved guide rail portions, and including a downstream conveyor surface on which the bakery products are conveyed downstream from said upstream conveyor surface, said downstream conveyor surface being characterized by lower friction than said upstream conveyor surface.

4. Apparatus as set forth in claim 1, wherein:

said conveyor mechanism on said aligning conveyor includes a driven conveyor surface on which the bakery products are conveyed; and said guides are mounted on the frame for movement generally up and down between an extended position wherein said guides project above said driven conveyor surface and a retracted position wherein said guides are retracted below said driven conveyor surface.

* * * * *